United States Patent [19]

Baldwin et al.

[11] 4,328,544

[45] May 4, 1982

[54] ELECTRONIC POINT-OF-SALE SYSTEM USING DIRECT-ACCESS STORAGE

[75] Inventors: Harry L. Baldwin; Beryl D. Bergschneider, both of Rochester, Minn.; Martin E. Chamoff, Austin, Tex.; Irving L. Miller, Pine Island, Minn.; Don W. Piller, Austin, Tex.; Max J. Robinett, Rochester, Minn.; Donald L. Thorson, Austin, Tex.

[73] Assignee: International Business Machines Corporation, Armonk, N.Y.

[21] Appl. No.: 109,738

[22] Filed: Jan. 4, 1980

[51] Int. Cl.³ .................. G06F 15/02; G06F 15/20
[52] U.S. Cl. ............................. 364/405; 364/900
[58] Field of Search .................. 364/405, 404, 900

[56] References Cited

U.S. PATENT DOCUMENTS 3,970,992 7/1976 Boothroyd et al. .............. 364/900
4,220,991 9/1980 Hamano et al. .................. 364/405

*Primary Examiner*—David H. Malzahn
*Attorney, Agent, or Firm*—J. Michael Anglin

[57] ABSTRACT

A standalone point-of-sale terminal in a unitary physical package has input/output devices for communicating transaction data between the terminal and an operator, and also has a cash drawer. These devices and a direct-access storage are controlled by a programmable processor which executes low-level routines from read-only addressable memory and serially replaceable high-level applications programs from read/write addressable memory. Both applications programs and transaction data are stored on a single non-volatile, removable storage medium.

9 Claims, 5 Drawing Figures

| | 0 | 1 | 2 | 3 | 4 | 5 | 6 | 7 |
|---|---|---|---|---|---|---|---|---|
| 00 | 0 | 1 | 0 | 0 | UC | | DE | UE |
| 01 | | INHIBIT DISK RESET | ADD | MDFY ADD | | WRITE | READ | SYNC |
| 02 | NO AUTO. RETRY | INHIBIT CS | | | | | | |
| 03 04 | DATA ADDRESS ||||||||
| 05 | ERROR CODE ||||||||
| 06 | ADD IN LAST 10 | ADD IN LAST 3 | FILE FULL | | | | DISK IN | |
| 07 08 | WORK AREA ADDRESS ||||||||
| 09 0A | BINARY LOGICAL RECORD OFFSET ||||||||
| 0B | BINARY NUMBER OF LOGICAL RECORDS ||||||||
| 0C 0D 0E 0F 10 | DATA SET NAME OR BINARY BOE ||||||||
| 11 12 13 | BINARY EOD ||||||||
| 14 15 16 | BINARY EOE ||||||||
| 17 18 19 | DISK ERROR LOCATION ||||||||

FIG. 4

ELECTRONIC POINT-OF-SALE SYSTEM USING DIRECT-ACCESS STORAGE

CROSS-REFERENCE TO RELATED APPLICATIONS

Other aspects of the basic system disclosed here, as well as further details, are shown in commonly assigned copending Application Ser. No. 950,091, filed Oct. 10, 1978 by M. E. Chamoff, I. L. Miller and D. L. Thorson, entitled Reconfigurable Cluster of Data-Entry Terminals, and Application Ser. No. 109,700, filed Jan. 4, 1980 by M. E. Chamoff and D. W. Piller, entitled Cluster of Data-Entry Terminals. These two applications are hereby incorporated by reference into the present application.

TECHNICAL FIELD

This invention relates to electronic point-of-sale systems for collecting, processing and recording data relating to business transactions. Such systems are also termed transaction recorders and electronic cash registers.

BACKGROUND ART

Various systems of data-entry terminals have been heretofore developed which enable the entry of data for data processing from a plurality of different locations. For example, prior systems have utilized a plurality of point-of-sale terminals in a retail store environment to enable sales data to be entered at a plurality of locations about a retail establishment. In such prior point-of-sale systems, the terminals have often been connected to a common data bus and the data directed to a common computer host which may be located at the retail establishment or at a remote location. Such systems are relatively bulky and expensive due to the requirement of a large and complex separate host data processing computer or controller for storing input data.

In order to eliminate the requirement of a separate on-line host data processing computer, stand-alone terminals have been previously developed utilizing magnetic storage cassettes which are used to record sales data from each terminal. The cassettes may then be subsequently removed and taken to a remote location for subsequent processing.

In point-of-sale terminal systems, it is necessary to perform arithmetic operations on sales data with the use of various function programs. In one type of point-of-sale system using a magnetic tape cassette, function programs for operating on point-of-sale data are permanently stored in read-only memories in each of the terminals. In another type of such prior systems, function programs are input into each of the terminals at the beginning of the day when the system is powered up. In both types of prior systems, there has been a requirement for storage in each of the terminals for function programs which are required to be executed during operation of the terminals. Such prior systems have thus required a plurality of separate storage facilities in each point-of-sale terminal to provide the desired operations.

A need has thus arisen for a point-of-sale data-entry terminal sytem wherein the data-entry terminals are self-contained in unitary portable housings without the requirement of an additional data recording housing or a separate controller time-shared among plural terminals. A need has also arisen for point-of-sale data terminals wherein all function or application programs are not permanently wired into read-only memory or the like, and yet wherein each terminal can perform a broad and variable range of functions independently of any connection to a programmable host computer or the like.

In brief, the computerization of the point-of-sale terminal has heretofore not taken full advantage of the flexibility inherent in the use of programmable processors, because conventional terminals are dependent upon unchangeable internally stored function programs and/or connections to external controllers or host processors.

DISCLOSURE OF INVENTION

The present invention proposes a standalone point-of-sale terminal which takes full advantage of the flexibility afforded by the use of an internal programmable processor, by allowing different applications programs to replace each other in the terminal without any connection to another computer or controller. This goal is achieved inexpensively and in a compact physical package by combining in a new way a number of elements which are individually well known in the art.

Generally speaking, a point-of-sale terminal according to the invention has a single, unitary package which holds and supports the other elements. Input/output devices, such as keyboards, displays and printers communicate transaction data between the terminal and an operator; a cash drawer is also provided. These devices are controlled by a processor which executes programs from an addressable memory, at least a part of which is capable of being written into as well as being read from (i.e., read/write memory, frequently termed RAM). Applications programs are loaded into this read/write memory from a direct-access storage means in the same enclosure. This storage employs a single removable, non-volatile medium such as a flexible magnetic disk (commonly known as a diskette) to hold both a plurality of different application programs and transaction data written out by the processor to the storage means. The term "direct access" in the present context refers to the ability of the storage mechanism to access (read or write) different items on the medium without accessing or passing through every item between the desired items. (A magnetic tape or other form which does require all intervening items to be accessed or passed is termed "sequential" storage in the art.) "Non-volatile" is also a term of art, referring to the ability to maintain stored information without the continuous application of some form of power or external energy source. The term "removable" as used herein signifies that the media are physically separable from the terminal, that they may be freely inserted, removed and substituted for each other.

The application programs or operating programs transferred between the storage medium and the addressable memory are high-level, functional routines which define the overall operation of the terminal in a given application. These programs are contrasted with low-level routines or subroutines which directly control hardware devices such as the displays, keyboard, etc. These two types of programs communicate with each other either directly or through intermediate-level routines for data formatting and so forth. The low-level routines may be kept permanently in a read-only portion of the addressable memory. As used herein "addressable" memory denotes fully random-access memory, wherein any data item may be accessed without accessing or passing through any other item in the memory.

BRIEF DESCRIPTION OF DRAWING

An embodiment of the invention will be described in connection with the accompanying drawing.

FIG. 4 shows a control block of a subroutine used with the invention.

FIG. 5 is a schematic representation of a disk layout used with the invention.

BEST MODE FOR CARRYING OUT THE INVENTION

Figure 1:
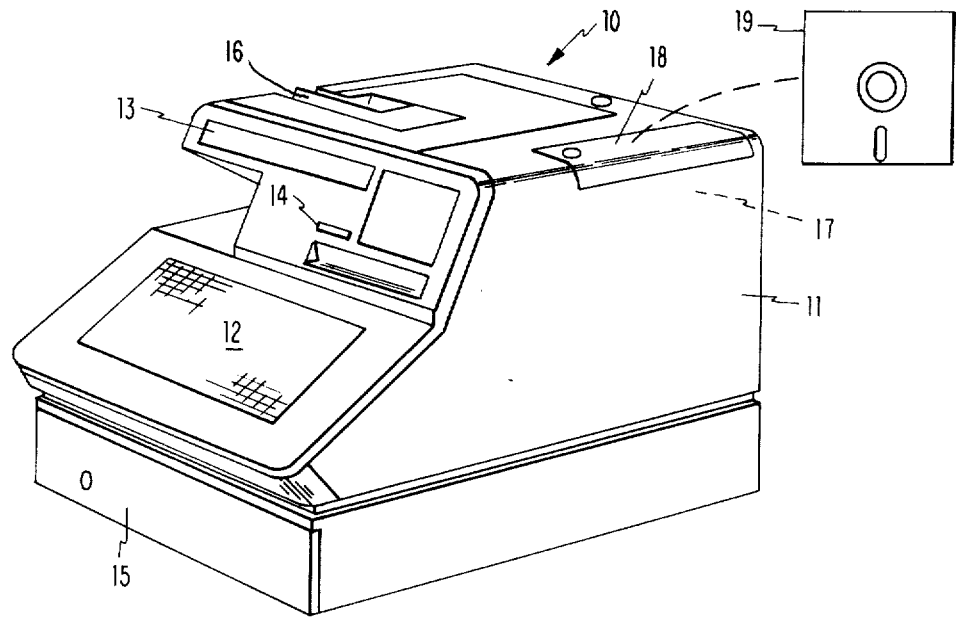
FIG. 1 of the drawing shows a point-of-sale terminal according to the invention.

FIG. 1 shows a counter-top point-of-sale system 10. Machine cover or housing 11 encloses the electronic and mechanical parts of the system. Data entry and display (i.e., input/output) devices include a keyboard 12, a multi-digit light-emitting diode (LED) display 13, a conventional rotatable message-drum display 14 for operator prompting, a cash drawer 15 and a multi-station printer 16. The printer prints a journal roll and either a receipt tape or cut-form documents; it is described in more detail in copending Applications Ser. No. 937,624, filed Aug. 28, 1978, now abandoned, and in its continuation Ser. No. 108,980, filed Jan. 2, 1980 by D. S. May et al and Ser. No. 948,860, filed Oct. 5, 1978 (now U.S. Pat. No. 4,229,113) by T. H. Anderson et al. Covers 11 also contain a flexible-disk (diskette) drive 17. Access door 18 allows the insertion and removal of a conventional magnetic disk 19. Door 18 may be made lockable.

Figure 2:
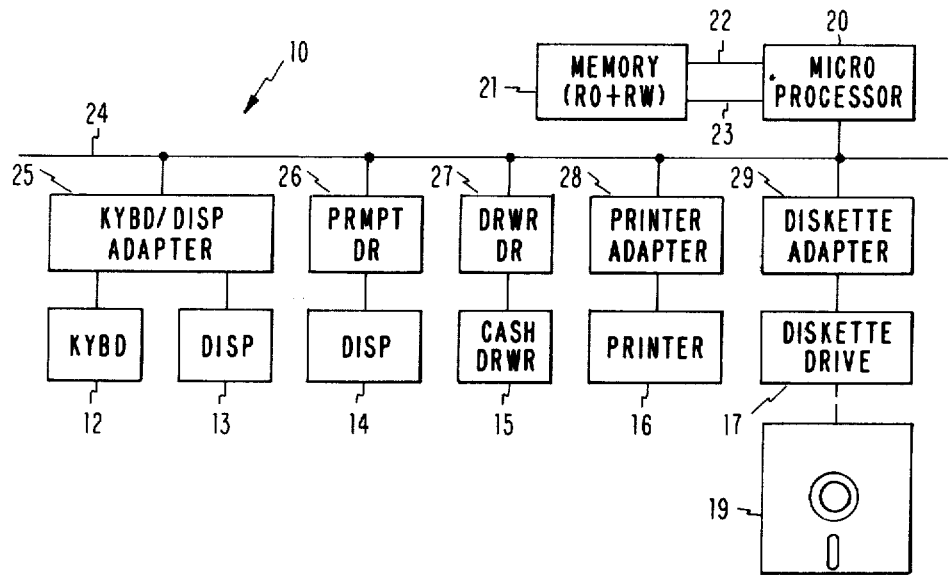
FIG. 2 is a block diagram of the terminal of FIG. 1.

FIG. 2 shows the elecronics portion of system 10, also contained within housing 11. A microprocessor 20 receives instructions and data from a memory 21 having address lines 22 and data lines 23. A part of memory 21 is read-only (ROM) and another part is read-write (RAM). Microprocessor 20 executes the instruction set of the publicly known IBM System/3 data processor. It is identical to the microprocessors described in copending Application Ser. No. 950,091. I/O bus 24 couples processor 20 to adapter interfaces for the devices mentioned above. A single adapter 25 of conventional design receives data from keyboard 12 and transmits data from bus 24 to display 13. A driver 26 steps message-drum display 14 to show the proper prompt message to the machine operator. Another driver 27 electrically locks and unlocks cash drawer 15. Adapter 28 transmits data from bus 24 to printer 16, and also receives signals concerning the status of the paper supply. A conventional diskette adapter 29 interfaces drive 17 to bus 24 in a conventional manner, to read and write information on diskette 19.

Other devices not shown in FIG. 1 could also be attached to bus 24. A hand-held wand for reading bar codes or stylized characters on merchandise labels may be desirable in some applications. A teleprocessing facility may be included for direct transmission to a data processor. A line adapter for communication with satellite terminals is described in copending Application Ser. No. 950,091. Even a simple, conventional parallel part or serial interface may be useful in some cases.

Figure 3:
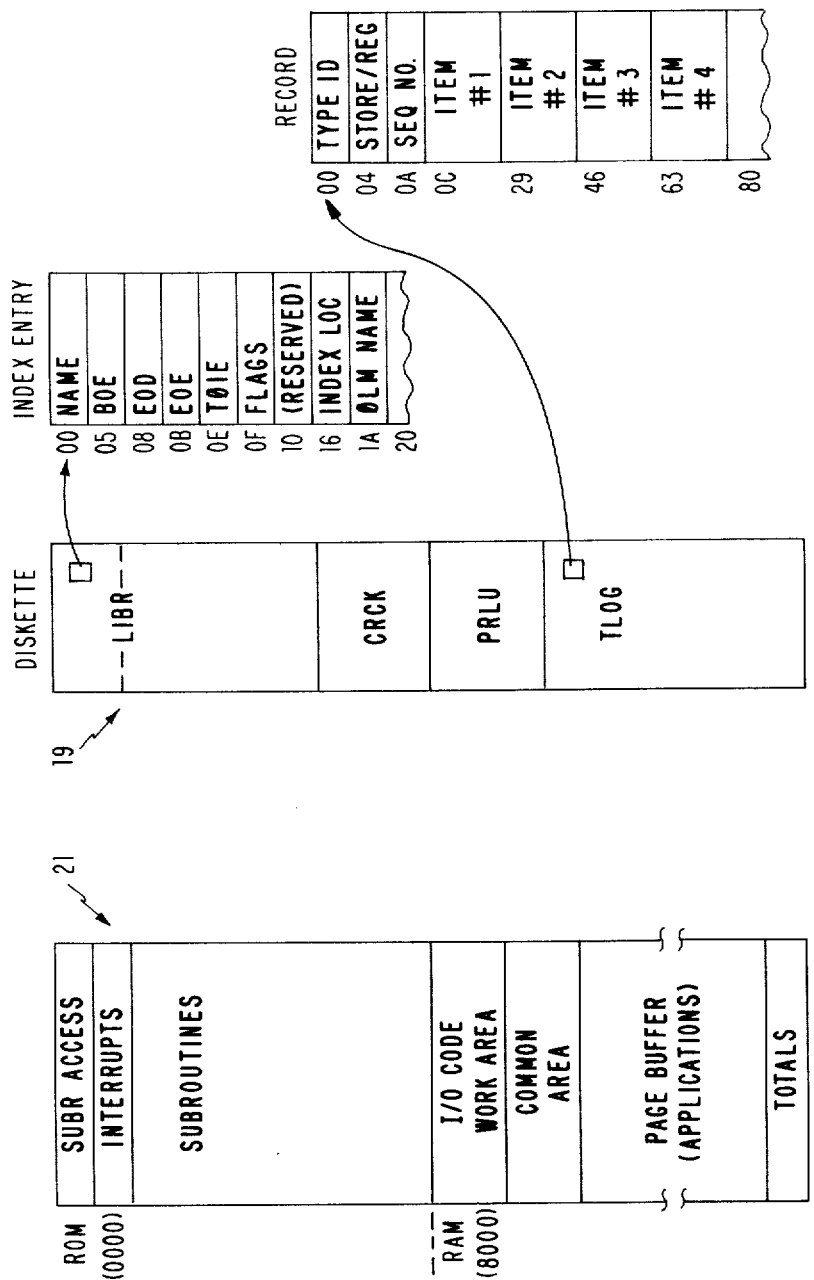
FIG. 3 is a memory map of the addressable memory of FIG. 2.

FIG. 3 is a map of memory 21. Read-only memory (ROM) begins at address 0000. ROM stores microcoded routines for subroutine access, interrupt handling and various subroutines for low-level machine control and for common data-management functions. Microprocessor 20 accesses or invokes a subroutine by executing a supervisor-call (SVC) instruction with a following code identifying the particular subroutine to be accessed. This procedure is described in more detail in the aforementioned Application Ser. No. 950,091. A conventionally organized interrupt handler processes prioritized interrupt requests from adapters 25–29, signalling such conditions as the depression of a keyboard key or diskette index-hole detection. Whether individual subroutines are stored in ROM or in RAM is subject to discretion. Low-level microcoded control routines for operating the I/O devices of system 10 itself are included in ROM. Basically these comprise XXKYIO, XXPRIO and XXLIO. XXKYIO controls keyboard 12 and displays 13, 14 through adapters 25, 26. XXPRIO controls cash drawer 15 and printer 16 via adapters 27, 28. Both of these are described in detail in Application Ser. No. 950,091. XXLIO provides the lowest level of control for diskette drive 17, via adapter 29. This subroutine is amplified hereinbelow. Higher levels of control may also be provided in ROM. For example, diskette files LIBR and TLOG contain entries in different formats; separate ROM routines format the appropriate logical entries for each file, then pass them to another routine which formats them into the physical sectors of diskette 19, then down to XXLIO for performing the actual reading or writing. Other common data-management functions may also be stored in ROM, for example, subroutines for comparing two data items for equality, or for handling certain error conditions. Such subroutines could be stored either in ROM or RAM; the more applications which use them, the more desirable it is to avoid having to read them into RAM before every use.

The read-write portion (RAM) of memory 21 begins at hex address 8000 and continues to the end of the physical memory in the particular machine: BFFF for a 16K machine, FFFF for a 32K, etc. RAM contains several fixed-length fields, such as an I/O control-code work area or scratchpad, a common area for communicating data between code modules and a totals area for hardtotals counters. The remainder of RAM forms a variable-length page buffer. It is this buffer which receives applications programs, and from which they are executed by microprocessor 20. They may be overlaid by other applications programs, either under direct operator control or automatically by code in the programs themselves. Transaction data being processed is also stored in RAM, under the control of the particular applications program being executed.

The diskette-file I/O control subroutine XXLIO is described herein because it is not used in the cluster terminals of Application Ser. No. 950,091. XXLIO performs all read and write functions for moving data and programs between a 0.24 megabyte diskette 19 in drive 17 and the RAM part of memory 21. FIG. 4 illustrates a control block for XXLIO; its address must be loaded into register XR1 prior to a call of XXLIO. XXLIO resets the control-block status bits in byte 0 prior to performing the request operation.

Calling Format:
SVC
DC XL1 'REQUEST CODE'

Disk 19 contains standard labels and data formats. Labels are in Track 0. A program/data library data set LIBR, described below, starts at Track 1, Sector 1. A file command may be directed to a specific disk address or to a data-file name. A command to a specific address is executed immediately. A command directed to a file name requires a search of index entries stored in LIBR. (That is, XXLIO does not use Track 0 index entries to locate data files.) The BOE, EOD, and EOE fields of the control block, FIG. 3, receive their entries from the LIBR index entry. The file-name command is then executed as though these entries had already been provided in the control block.

The control block of FIG. 4 contains the following entries:

Byte 0 Bits 0–3—X'4' identifies the 0.24 megabyte control block.

Byte 0 Bit 4—The "unit check" status bit is set a device-end time of command execution if an error was detected. Byte 5 contains a code describing the error condition. Bytes 17–19 contain the error location, except for a "disk full" condition (cf. Byte 6).

Byte 0 Bit 6—The "device end" status bit is set when command execution is complete.

Byte 0 Bit 7—The "unit exception" status bit indicates that a recoverable error had occurred during command execution. The error code appears in Byte 5; the location is in Bytes 17–19.

Byte 1 Bit 1—The "inhibit disk reset" command bit waits for a cancel request, then tests to determine whether a diskette is inserted. If so, the disk-reset function is enabled; otherwise, it remains disabled.

Byte 1 Bit 2—The "add" command bit causes the record (128 bytes) located at the Data Address (Bytes 3-4) to be written at the EOD address. This address is then incremented by one in Bytes 11-13 (but not on the diskette Track 0 or 1).

Byte 1 Bit 3—The "modify add" command bit causes the record at the Data Address to be written into the file at address EOD-1.

Byte 1 Bit 5—The "write" bit causes the data at the Data Address written to the file, starting at the BOE address, plus the offset contained in Bytes 9-A. Byte B contains the number of 128-byte records to be written. This command does not update the EOD address in either the control block or the LIBR index entry.

Byte 1 Bit 6—The "read" bit operates inversely: file records from BOE and Offset are read into memory at Data Address. If the read operation would read past EOD (Bytes 11-13), the actual number of records read is indicated in Byte 13 at device-end time.

Byte 1 Bit 7—The "sync" bit causes the disk access mechanism to align itself over Track 0.

Byte 2 Bit 0—This bit specifies whether or not automatic retries will be performed for error conditions.

Byte 2 Bit 1—This bit selects whether a specified operation is to be performed with or without cycle-stealing data to or from memory.

Bytes 3-4—The "data address" is the destination address in memory address for read operations, and the source address for write, add and modify-add. It points to the leftmost byte of the data buffer.

Byte 5—The "error code" describes a particular error detected during an operation.

Byte 6 Bits 0–2—These bits are set when an add operation has been completed in the last 4-10, 2-3 or 1 sectors of a file, respectively. Unit check (Byte 0 Bit 4) is set when these conditions are detected.

Byte 6 Bit 6—This bit is set at all device-end times to indicate whether or not a disk is present in the drive.

Bytes 7-8—This address points to a 128-byte work area used by XXLIO in index searches.

Bytes 9-A—These bytes contain the number of disk sectors past BOE (Bytes C-10) that reading or writing is to begin.

Byte B—This byte specifies the number of 128-byte records to be read or written. It is set to the number of bytes actually read at the end of read commands.

Bytes C-10—This location contains either a 5-character data-set name or a beginning-of-extent address having 3 bytes specifying cylinder/head/record.

Bytes 11-13—These 3 bytes specify the end-of-data address.

Bytes 14-16—These bytes contain the end-of-extent address.

Bytes 17-19—These bytes specify the cylinder/head/record of a disk error location.

The diskette 19 contains labels and data in a publicly available standard format. The labels are located on Track 0, and identify the names and addresses of the data sets on the disk. FIG. 5 shows the major data sets for the present embodiment, LIBR and TLOG. CRCK and PRLU, physically following TLOG on the same diskette, contain credit-check and price-lookup tables used by some applications routines.

LIBR, which begins at Track 1, Sector 1 of the disk, has two segments. One segment contains applications routines and data sets used by or with these routines. The other segment, Track 1 on the disk, contains index entries for these items. The first index entry is that of LIBR itself. An expansion of the 32-byte entry format is shown in FIG. 5. Bytes 0-4 contain a 5-character file name. Bytes 5-7 specify the beginning-of-extent address of the named file; that is, the BOE is the address of the first byte of the file. Bytes 8-A specify the end-of-data address; i.e., the location of the last valid (non-empty) data byte within the file. The end-of-extent address in bytes B-D specifies the last physical address of the file. Byte E indicates which sector of Track 0 contains the corresponding index entry (or X'00' if there is none). Byte F contains several flag bits. Bytes 10-15 are not used. Bytes 16-1F specify the types and extent of checking to be performed on corresponding Track-0 entries.

TLOG is physically the second file on the disk. TLOG has a fixed-length record structure, but its format accommodates variable-length transactions logged out to disk by any one of a large number of applications routines. The particular record format shown in FIG. 5 allows transactions to be fragmented or duplicated, and yet to be processed correctly by a host processor even if its parts are not input in the correct order.

Every record of a transaction contains 128 (X'80') bytes, comprising a 12-byte header and four 29-byte data items. Bytes 0-3 contain a separate record type identifier for each data item, defining the item's number of fields and the length, order and content of those fields. A header item is identified by the EBCDIC character "A", while "B" identifies a trailer item. A store/register number in bytes 4-9 identifies the particular terminal which created the record. A two-byte sequence number is incremented by the terminal for every successive record, without regard to transaction boundaries, and wraps around to 00 after reaching 99; this aids in piecing together interrupted transactions and allows detection of missing and duplicate records. The four 29-byte items of each record contain data specified by the particular applications routine which create them. The order in which the items appear in the record is the sequence in which the data is collected by the terminal. The first item of the first record for every transaction is a header. The header contains a transaction-type code, a transaction number, a sales person code, the time and the date. Headers are also logged during terminal initialization, sign-on, open, close and selection of non-sales functions; they may function as an audit trail for all terminal activity. If any data are generated by the activity which produced the header, other items will also be written. Examples of such other data include customer account numbers, merchandise identification numbers, tax amounts, amounts tendered, payments, discounts and allowances. If the data do not fit into a single record, items in additional records will be written. A trailer item is written for any transaction consisting of more than merely a header. This item summarizes sales transactions and aids in the reconstruction of transactions spanning multiple records. The trailer contains a trailer code, the same transaction number as that of the corresponding header, and other information such as a transaction total monetary amount.

A point-of-sale system 10 is placed in service by inserting a disk 19 into drive 17 and powering up. Conventional initializing ROM subroutines in memory 21 read into RAM an initializing application program which has previously been personalized to set up the machine for the particular functions desired to be performed. This application program is stored on diskette 19 in the LIBR file, FIG. 5; its transfer is achieved by ROM subroutine XXLIO, FIG. 4. The initializing program then calls into RAM any of a large number of applications programs. These programs, all stored in LIBR, may be written in the well-known IBM System/3 assembly language. Alternatively, general-purpose programs may be personalized by specifying certain options through a personalization application program which is also read into RAM from LIBR. This may be done by requesting keyboard responses to a sequence of multiple-choice questions supplied to the user in a booklet, and/or by displayed messages. Personalization is effected internally by the conventional technique of setting specified entries in a table which an application program uses at the appropriate places to branch to alternative code for carrying out the desired functions.

Application programs may be written to carry out an arbitrary number of functions on system 10. Some representative applications include totals readout, cash count, erase log, loan/withdrawal, void prior transaction and print log. The most important single application for most users is "sales mode", which enables system 10 to perform a number of frequent types of retail transactions. The appended printout, entitled SLS16D, contains detailed code, written in the instruction set of the IBM System/3, for a 16K-byte machine and using domestic (U.S.) sales-tax calculations. This program occupies 12,915 bytes in the page buffer of FIG. 3. It controls I/O devices 12–16, FIG. 1, through levels of subroutines which ultimately employ ROM subroutines XXKYIO and XXPRIO. It formats transaction data items and writes them out to diskette 19 through subroutines which invoke ROM routine XXLIO. It can also terminate itself by overlaying the RAM page buffer with another application program called in from LIBR by XXLIO.

We claim:

1. A point-of-sale terminal for recording transaction data, said terminal comprising:

programmable processing means including read/write addressable memory for holding both applications programs and data, and further including read-only memory holding routines for loading different ones of said applications programs into said read/write memory;

direct-access storage means coupled to said processing means and adapted to read and write a single removable, non-volatile storage medium holding both said applications programs and said transaction data;

input means coupled to said processing means for receiving said transaction data from an operator;

output means coupled to said processing means for displaying said transaction data;

cash-handling means controlled by said processing means in response to said applications programs; and enclosure means for housing all the above means in a single physical package, said enclosure means further including means for inserting and removing said removable storage medium in said direct-access storage means.

2. The point-of-sale terminal of claim 1, wherein said input means includes a keyboard.

3. The point-of-sale terminal of claim 1, wherein said output means includes both visible display means and printing means.

4. The point-of-sale terminal of claim 1, further comprising prompt means responsive to said processing means for displaying messages to said operator.

5. A point-of-sale terminal for recording transaction data, said terminal comprising:

keyboard means for receiving transaction data from an operator;

display means for outputting said transaction data to said operator;

direct-access storage means for writing said transaction data onto a removable, non-volatile storage medium, and for reading a plurality of applications programs from the same storage medium;

addressable memory means having a read/write part and having a read-only part, said read-only part including microcoded routines;

programmable processing means coupled to said keyboard means, said display means, said direct-access storage means and said addressable memory means for executing said microcoded routines so as to load different ones of said applications programs from said direct-access storage means to said read/write part and for executing said applications programs directly from said read/write part; and enclosure means for holding the above means in a unified physical package adapted to rest on a counter top.

6. The point-of-sale terminal of claim 5, wherein said storage medium is a magnetic medium and wherein said direct-access storage means comprises a drive adapted to hold said magnetic medium.

7. The point-of-sale terminal of claim 6, wherein said magnetic medium comprises a flexible magnetic disk.

8. The point-of-sale terminal of claim 5, wherein said read-only part of said addressable memory means further includes microcoded routines for controlling said keyboard means and said display means.

9. The point-of-sale terminal of claim 5, wherein said keyboard means, said display means and said direct-access storage means are coupled to said processing means via a common bus.

* * * * *